S. S. White,

Making Teeth.

No. 1,305. Reissued Apr. 29, 1862.

Witnesses
James Laird
Richardson Gurley

Inventor
Samuel S. White

UNITED STATES PATENT OFFICE.

SAMUEL S. WHITE, OF PHILADELPHIA, PENNSYLVANIA.

IMPROVEMENT IN THE MANUFACTURE OF ARTIFICIAL TEETH.

Specification forming part of Letters Patent No. 34,223, dated January 21, 1862; Reissue No. 1,305, dated April 29, 1862.

*To all whom it may concern:*

Be it known that I, SAMUEL S. WHITE, of the city of Philadelphia, in the county of Philadelphia and State of Pennsylvania, have invented a new and useful Improvement in Artificial Teeth; and I do hereby declare that the following is a full, clear, and exact description of the same, reference being had to the accompanying drawings, forming part of this specification.

This invention relates to mineral teeth, for what is known as "vulcanite" work. The teeth commonly employed in such work are secured in the vulcanite setting by the aid of pins of platinum, parts of which are received in the teeth and parts in the vulcanite. These pins, which are secured in the teeth in the manufacture of the latter, and before they come into the hands of the dentist, have been commonly made without heads at their outer ends, and the only means employed to fasten them in the vulcanite beyond the adhesion of the vulcanite itself has been by the dentist bending them before applying them to the setting, and the consequence has been that the pins have been very liable to tear out of the vulcanite. To obviate this difficulty and supply the dentist with teeth which are applicable to the vulcanite without any preparation or manipulation of the pins, and which after vulcanization will be so firmly embedded and fastened in the vulcanite as not to be liable to disturbance by ordinary wear or by any probable accident, and to this end my invention consists in the manufacture of the teeth with pins having heads at their outer ends.

Figure 2:
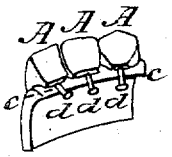
Figure 1:
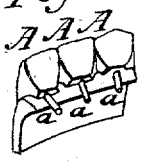
Figure 3:
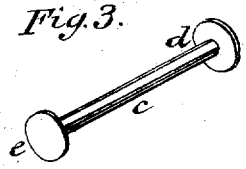
Figure 4:
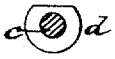

To illustrate the invention, Figure 1 is a perspective view of three gum teeth, A A A, made with platinum pins of the usual construction. Fig. 2 is a similar view of similar teeth made with platinum pins C C C, having heads *d d d* at their outer ends according to my invention. Fig. 3 is a perspective view of one of the pins before its insertion in the tooth. Fig. 4 is a transverse section of a pin illustrating a modification of the head.

Similar letters of reference indicate corresponding parts where they occur in the different figures.

In the manufacture of the teeth with pins having heads at their outer ends, the said heads *d d* may be of circular form, projecting all around the pins, as shown in Fig. 3; but in some cases it may be better to make them of the form shown in Fig. 4—that is to say, that of a circle with a segment cut off forming a straight side—the object being to avoid the protrusion of the head through the outer surface of the vulcanite setting; and the inner ends of the pins which are received within the teeth may also be made with heads, as shown at *e* in Fig. 4, or may be made of any other form that will enable them to be secured in the teeth; but with this latter part of the pin my invention has nothing to do.

To provide for securing the pins in the teeth, holes are made in the molds in which the teeth are cast for the reception of the heads *d d d*, such holes being just large enough at the bottom or back for the said heads to fit tightly within them and having a slight gradual enlargement toward their mouths, to enable the pins to draw out easily from them in the removal of the teeth from the molds. Before casting the teeth the heads of the pins are inserted in the said holes and the holes filled up all around the pins with some of the plastic mineral composition of which the teeth are cast, after which the casting of the teeth is proceeded with in the usual manner. On the opening of the mold and removal of the teeth the composition with which the holes in the molds were filled up around the pins comes out with the pins, and requires to be cut away from the teeth and pins before the baking process. Another way of securing the pins is to drill in the teeth after the first baking or burning, technically known as "biscuiting," holes large enough for the reception of the heads *e e e*, and then to pack around the pins within the said holes with some of the plastic mineral composition and afterward subject the teeth to the second burning process, by which they are finished.

As the insertion of pins having heads at their outer ends in the manufacture of the teeth is something entirely new, I do not confine myself to any mode of inserting the pins; but

What I claim as my invention, and desire to secure by Letters Patent, is—

The manufacture of mineral teeth with pins having heads *d d* at their outer ends, substantially as herein specified.

SAMUEL S. WHITE.

Witnesses:

A. MUSTIN, Jr.,

THOS. H. STOCKTON, Jr.